(12) United States Patent
Kim et al.

(10) Patent No.: US 12,184,801 B2
(45) Date of Patent: Dec. 31, 2024

(54) APPARATUS AND METHOD FOR SYNCHRONIZING CONSENSUS NODE INFORMATION IN BLOCKCHAIN NETWORK

(71) Applicant: ELECTRONICS AND TELECOMMUNICATIONS RESEARCH INSTITUTE, Daejeon (KR)

(72) Inventors: Young-Chang Kim, Daejeon (KR); Ki-Young Kim, Daejeon (KR); Jin-Tae Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 186 days.

(21) Appl. No.: 17/844,596

(22) Filed: Jun. 20, 2022

(65) Prior Publication Data

US 2023/0188367 A1 Jun. 15, 2023

(30) Foreign Application Priority Data

Dec. 14, 2021 (KR) ........................ 10-2021-0178912

(51) Int. Cl.
*H04L 9/00* (2022.01)
*H04L 9/30* (2006.01)

(52) U.S. Cl.
CPC . *H04L 9/50* (2022.05); *H04L 9/30* (2013.01)

(58) Field of Classification Search
None
See application file for complete search history.

(56) References Cited

U.S. PATENT DOCUMENTS 11,343,073 B2    5/2022  Oh
2019/0147438 A1*  5/2019  Micali ................ G06Q 20/4016
                                                                705/71

(Continued)

FOREIGN PATENT DOCUMENTS

CN        112187490 A   *  1/2021  ............. H04L 41/30
KR  10-2019-0054738 A      5/2019
(Continued)

OTHER PUBLICATIONS

Sambhav Satija et al., "Blockene: A High-throughput Blockchain Over Mobile Devices", 14th USENIX Symposium on Operating Systems Design and Implementation, Nov. 4, 2020.

*Primary Examiner* — Christopher C Harris

(57) ABSTRACT

Disclosed herein are an apparatus and method for apparatus for synchronizing consensus node information in a blockchain network. The apparatus for synchronizing consensus node information includes one or more processors, and execution memory for storing at least one program that is executed by the one or more processors, wherein the at least one program is configured to receive a committed message for block consensus from the blockchain network and verify nodes participating in the block consensus, set a block number required to participate in the block consensus to a block size of a start block of a section corresponding to the block consensus, and broadcast consensus node information including the block number to the blockchain network.

12 Claims, 9 Drawing Sheets

(56) References Cited

U.S. PATENT DOCUMENTS

| | | | | |
|---|---|---|---|---|
| 2019/0251077 A1* | 8/2019 | Yang | .................. | G06F 16/2379 |
| 2019/0260574 A1* | 8/2019 | Shi | ......................... | H04L 9/321 |
| 2019/0327084 A1 | 10/2019 | Oh | | |
| 2019/0379538 A1 | 12/2019 | Oh | | |
| 2020/0117657 A1* | 4/2020 | Xie | ....................... | H04L 9/3239 |
| 2020/0120157 A1* | 4/2020 | Xie | ....................... | H04L 9/0643 |
| 2020/0125556 A1* | 4/2020 | Yang | ....................... | H04L 9/50 |
| 2021/0026745 A1* | 1/2021 | Wang | .................... | G06F 11/183 |
| 2021/0034455 A1* | 2/2021 | Deng | ....................... | H04L 9/14 |
| 2021/0160152 A1* | 5/2021 | Spiegelman | ......... | H04L 67/1001 |
| 2021/0314179 A1* | 10/2021 | Liao | ............. | H04L 9/3297 |
| 2022/0131960 A1* | 4/2022 | Signorini | ................ | H04L 69/03 |
| 2023/0059580 A1* | 2/2023 | Manevich | ................... | H04L 9/3218 |
| 2023/0100485 A1* | 3/2023 | Baek | .................... | H04L 9/3255 |
| | | | | 713/189 |

FOREIGN PATENT DOCUMENTS

| | | |
|---|---|---|
| KR | 10-2020-0144466 A | 12/2020 |
| KR | 10-2021-0062294 A | 5/2021 |
| KR | 10-2314495 B1 | 10/2021 |

* cited by examiner

APPARATUS AND METHOD FOR SYNCHRONIZING CONSENSUS NODE INFORMATION IN BLOCKCHAIN NETWORK

CROSS REFERENCE TO RELATED APPLICATION

This application claims the benefit of Korean Patent Application No. 10-2021-0178912, filed Dec. 14, 2021, which is hereby incorporated by reference in its entirety into this application.

BACKGROUND OF THE INVENTION

1. Technical Field

The present disclosure relates generally to blockchain consensus technology, and more particularly to technology for synchronizing information about consensus nodes qualified to participate in block consensus in a blockchain network.

2. Description of the Related Art

Research into various block consensus methods for generating blocks and reaching consensus on the generated blocks has been conducted in peer-to-peer (p2p)-based blockchain networks. It is difficult to maintain uniform information of nodes dynamically connected to a network for respective blocks. Therefore, there is required research into methods for allowing all nodes to be equally synchronized with information about all consensus nodes connected to a blockchain network even in an environment in which nodes are frequently connected to and disconnected from the blockchain network.

Meanwhile, Korean Patent Application Publication No. 10-2020-0144466 entitled "Apparatus and Method for Processing Distributed Consensus on Decentralized Byzantine Fault Tolerance" discloses an apparatus and method for reaching distributed consensus between a large number of decentralized nodes through more lightweight message exchange while accommodating Byzantine Fault Tolerance (BFT)-based distributed consensus protocols through centralized nodes.

However, the technology disclosed in Korean Patent Application Publication No. 10-2020-0144466 has limitations in synchronizing information about nodes qualified to participate in consensus in an environment in which nodes are frequently dynamically connected to and disconnected from the blockchain network.

SUMMARY OF THE INVENTION

Accordingly, the present disclosure has been made keeping in mind the above problems occurring in the prior art, and an object of the present disclosure is to synchronize information about nodes qualified to participate in consensus in an environment in which nodes are frequently dynamically connected to and disconnected from a blockchain network.

In accordance with an aspect of the present disclosure to accomplish the above object, there is provided an apparatus for synchronizing consensus node information in a blockchain network, including one or more processors, and an execution memory for storing at least one program that is executed by the one or more processors, wherein the at least one program is configured to receive a committed message for block consensus from the blockchain network and verify nodes participating in the block consensus, set a block number required to participate in the block consensus to a block size of a start block of a section corresponding to the block consensus, and broadcast consensus node information including the block number to the blockchain network.

The at least one program may be configured to check a section corresponding to the block consensus, included in the committed message, and receive a block corresponding to the section from the blockchain network.

The at least one program may be configured to receive a last block corresponding to the section and thereafter receive snapshots including hash values of nodes participating in the block consensus from adjacent nodes.

The at least one program may be configured to verify the nodes participating in the block consensus by comparing the hash values included in the snapshots with each other to determine whether the hash values are equal to each other.

The at least one program may be configured to set a time point at which a new nonce chain is to be generated using propagation delay of the blockchain network and the block size of the start block.

The consensus node information may include a number of nodes that are capable of participating in consensus and for which synchronization with the blockchain network is completed, node identifiers, a last nonce of a new nonce chain, and a block number on which participation in block consensus starts.

In accordance with another aspect of the present disclosure to accomplish the above object, there is provided a method for synchronizing consensus node information in a blockchain network, the method being performed by an apparatus for synchronizing consensus node information in the blockchain network, the method including receiving a committed message for block consensus from the blockchain network and verifying nodes participating in the block consensus, setting a block number required to participate in the block consensus to a block size of a start block of a section corresponding to the block consensus, and broadcasting consensus node information including the block number to the blockchain network.

Verifying the nodes may include checking a section corresponding to the block consensus, included in the committed message, and receiving a block corresponding to the section from the blockchain network.

Verifying the nodes may further include receiving a last block corresponding to the section and thereafter receiving snapshots including hash values of nodes participating in the block consensus from adjacent nodes.

Verifying the nodes may further include verifying the nodes participating in the block consensus by comparing the hash values included in the snapshots with each other to determine whether the hash values are equal to each other.

Setting the block number may include setting a time point at which a new nonce chain is to be generated using propagation delay of the blockchain network and the block size of the start block.

The consensus node information may include a number of nodes that are capable of participating in consensus and for which synchronization with the blockchain network is completed, node identifiers, a last nonce of a new nonce chain, and a block number on which participation in block consensus starts.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
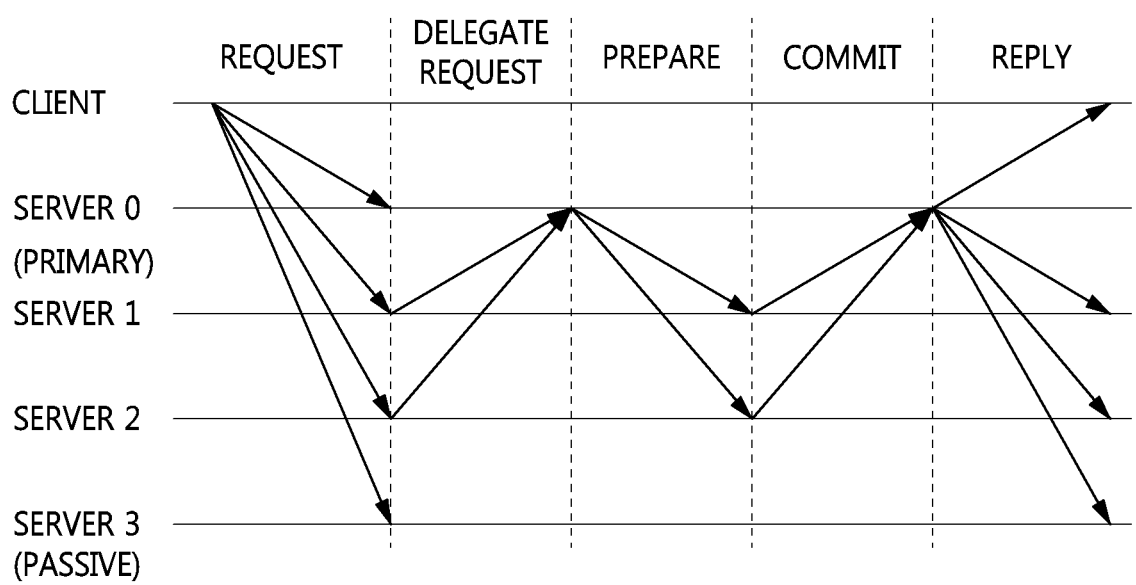
FIG. 1 is a diagram illustrating a distributed consensus protocol according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present disclosure will be described in detail with reference to the attached drawings.

FIG. 1 is a diagram illustrating a distributed consensus protocol according to an embodiment of the present disclosure.

Referring to FIG. 1, individual nodes joining a blockchain network may reach consensus on each block by participating in a committee for block consensus through verification of qualification to participate in block consensus for each block. Such block consensus is conducted through a four-step consensus process including delegate request, prepare, commit, and reply steps. Such a block consensus process may select 3f+1 nodes to participate in consensus for each block, and may work to reach block consensus through multi-signature of 2f+1 nodes, among the selected nodes.

Here, each of the nodes joining the blockchain network may correspond to an apparatus for synchronizing consensus node information in the blockchain network according to an embodiment of the present disclosure.

Here, the number of nodes participating in a committee, that is, 3f+1, may be determined according to the ratio of the number of nodes that are qualified to participate in consensus (i.e., the number of participating nodes) and are connected to the blockchain network for Byzantine fault tolerance to the number of Byzantine nodes. Each node may use a difficulty that is determined depending on the number of participating nodes to check whether the 3f+1 nodes are qualified to participate in a committee.

That is, all participating nodes connected to the blockchain may use the same difficulty and the same number (3f+1) of committee nodes.

Figure 2:
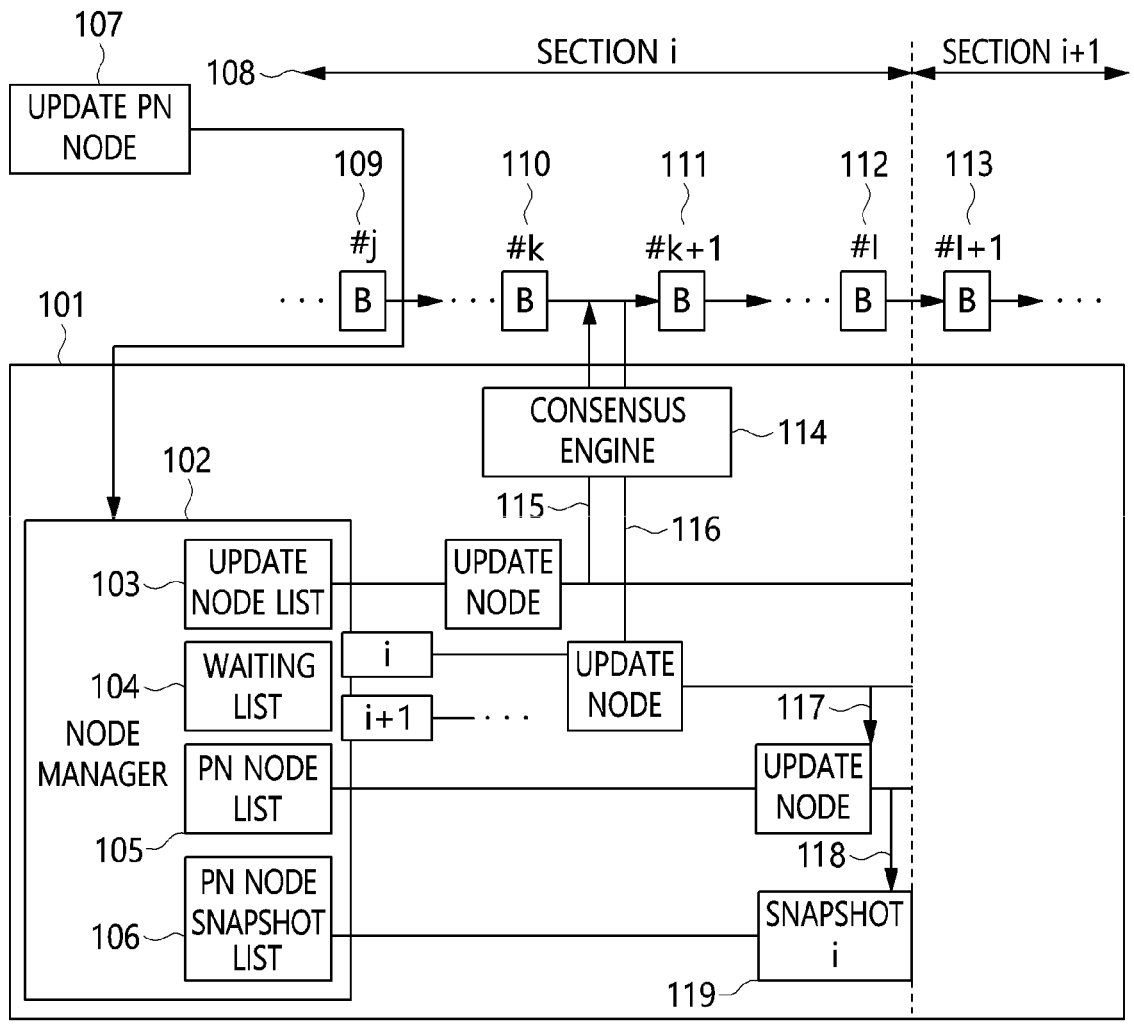
FIG. 2 is a diagram illustrating a process of synchronizing consensus node information for a new node or an update node in a blockchain network according to an embodiment of the present disclosure.

FIG. 2 is a diagram illustrating a process of synchronizing consensus node information for a new node or an update node in a blockchain network according to an embodiment of the present disclosure.

Referring to FIG. 2, it can be seen that a new participating node is added (new node) to a blockchain network, or that updated consensus node information of an existing participating node (update node) is synchronized.

As shown in the drawing, a participating node 101 connected to the blockchain network may include a consensus engine 114 and a node manager 102 for managing consensus node information.

The consensus engine 114 may perform a 4-step block consensus process, illustrated in FIG. 1, using 3f+1 committee nodes selected in the consensus process.

In this case, the consensus engine 114 may function to allow a leader node, selected from among the committee nodes, to broadcast a consensus block to all nodes connected to the blockchain through a committed message.

Here, after a blockchain 109 to 113 in which consensus blocks are connected to each other is received through a committed message, the consensus engine 114 may check the consensus block, or the consensus node information of a committee to reach a consensus on a subsequent block included in the message.

For example, when the consensus block, that is, block #k 110, is received over the network, the consensus engine 114 may determine whether the consensus engine 114 itself is included in the committee node.

When the consensus engine 114 is included in the committee node, it may reach a consensus on a new block #k+1 while exchanging a consensus message with other determined committee nodes, and the leader node of the corresponding committee newly broadcasts the corresponding consensus block to the blockchain network, and may repeat a subsequent block consensus process.

It can be seen that section i and section i+1 indicate a synchronization period 108 for consensus node information of the committee.

For example, when the synchronization period for committee consensus node information is 10, every 10 blocks, a registration request for a new node or an update request message for an update node may be broadcasted over the blockchain network while consensus on blocks is being reached in the corresponding section.

The broadcasted message may be delivered to and verified by committee nodes through a consensus message in the block consensus process, and thus the committee nodes may agree on the consensus node information of the new node or update node.

The consensus node information agreed on by means of this process may be included in the consensus block or committed message, and may then be delivered to all nodes connected to the blockchain.

Here, an update PN node 107 may be a new node or an update node.

For example, when the new node broadcasts a registration request to the network after block #j, on which a consensus was reached, has been broadcasted to the network, the participating node having received the corresponding information may register the consensus node information in an update node list 103.

Also, after a committee leader node for block #k+1 has received block #k, the committee leader node may transfer consensus node information registered in the update node list 103 during a process for reaching a consensus on block #k+1 to the committee nodes, and may verify the consensus node information. The consensus node information that has been verified may be broadcasted to the network through block #k+1 on which consensus has been reached or the committed message.

A participating node having received block #k+1 or the committed message may register consensus node information of the new node or the update node by which consensus has been reached on the block in a waiting list 104.

Here, when consensus node information is present in the update node list 103, it may be deleted from the update node list 103.

The waiting list 104 may manage consensus node information to be synchronized with a PN node list 105 in each section. 'i' means that the consensus node information to be added to or updated in the PN node list 105 at the time point at which section i is terminated is managed as a list, and 'i+1' means consensus node information to be added or updated at the time point at which a subsequent section is terminated.

The reason for maintaining different section lists is to prevent the occurrence of the case where, when the added consensus node information is located in the last portion of the corresponding section or is added late due to network propagation delay or the like, both a participating node in which addition of the consensus node information is reflected and a participating node in which addition of the consensus node information is not reflected are present, and then a synchronized PN node list is generated.

For example, in the case where a synchronization period is 10 blocks and the new node 107 transfers consensus node information in eighth to tenth blocks of the corresponding period, if a node having received the consensus node information is not selected as a committee leader node for the eighth to tenth blocks, the situation in which the corresponding node cannot be synchronized with a participating node list (PN node list) may occur.

Therefore, when the new node determines the section with which it is to be synchronized, the new node may determine the section in consideration of network propagation delay and the probability that the node having received the consensus node information will be a leader node. When the leader node determines the section with which the corresponding node is to be synchronized during a consensus process, the current section may be determined to be a synchronization target section.

When the consensus node information of the new node or the update node is registered in the waiting list through the above-described process, the registered consensus node information may be reflected in the corresponding section of the waiting list at the time point at which the last block is received in the section, and thus the PN node list may be updated (117). Further, a snapshot i (119) of information of the updated PN node list may be created and added to a PN node snapshot list 106 (118).

Here, the created PN node snapshot may be used in a process in which the new node synchronizes existing consensus node information. That is, a node newly connected to section i may receive the snapshots i of the corresponding section from other nodes at the end time point of section i, may register the snapshots i in its own PN node list 105, and may maintain the same participating node list as the other participating nodes from section i+1.

Figure 3:
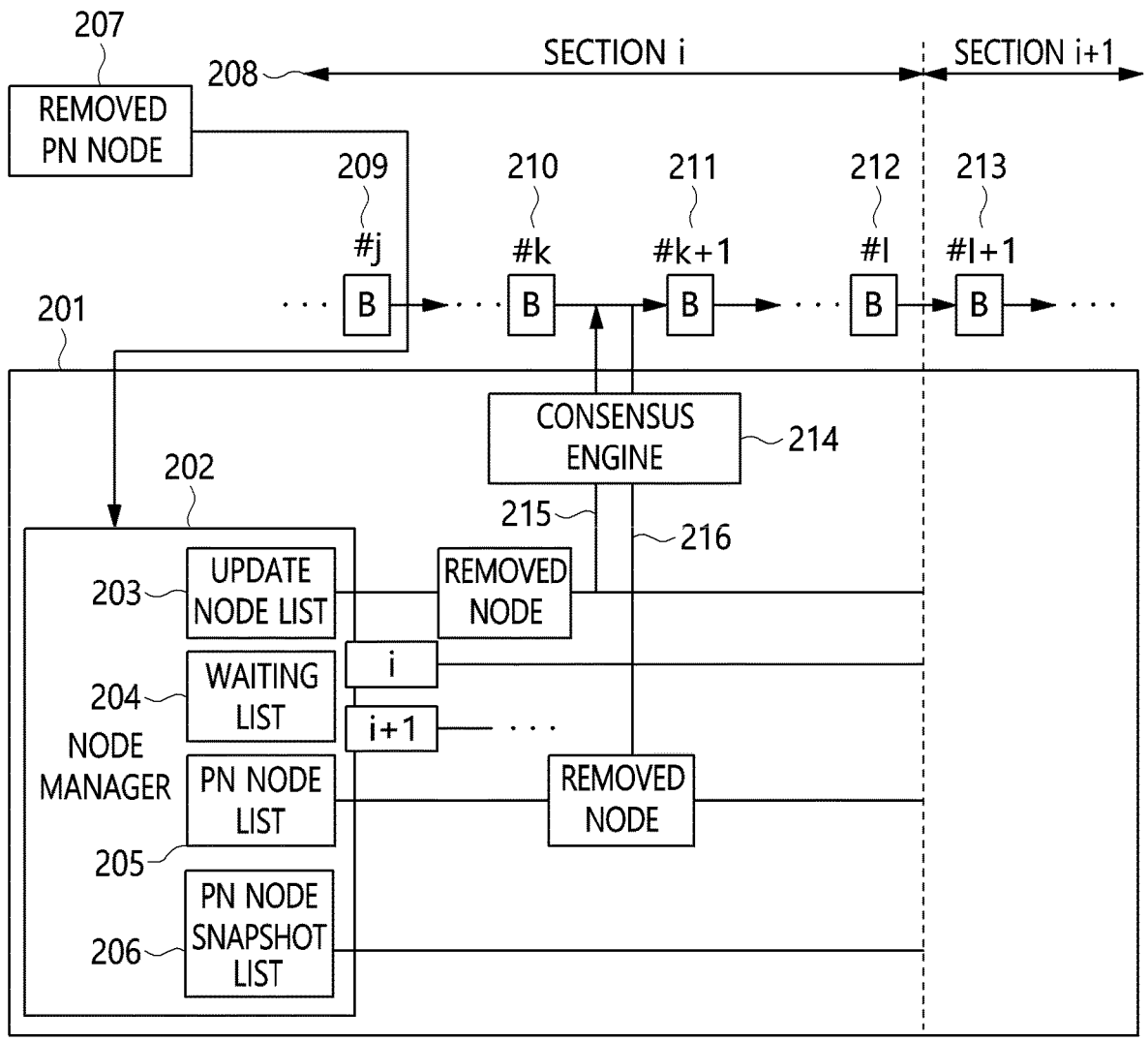
FIG. 3 is a diagram illustrating a process of synchronizing consensus node information for node termination or a removed node in a blockchain network according to an embodiment of the present disclosure.

FIG. 3 is a diagram illustrating a process of synchronizing consensus node information for node termination or a removed node in a blockchain network according to an embodiment of the present disclosure.

Referring to FIG. 3, the process of synchronizing information about a node removed from consensus node information (i.e., removed node) for a reason such as normal node termination or failure is illustrated.

The information about the removed node may be reflected in a PN node list at the time point at which a section is terminated in the same manner as the new node or the update node, described above with reference to FIG. 2. However, when a synchronization period is lengthened, if the number of removed nodes is greater than f out of 3f+1, which corresponds to a committee size, the situation in which consensus is interrupted may occur. That is, when f or more nodes are removed from committee nodes selected in the block consensus process, there may occur the situation in which there are not enough nodes to reach consensus.

In this case, as illustrated in FIG. 3, after propagation of block #j has been completed, a request to release a removed node (i.e., a removed PN node) 207 may be broadcasted, and may then be registered in an update node list 203 for participating nodes.

In this case, when the corresponding node is the committee leader node for block #k+1 211, if removed consensus node information is verified (215) through a consensus process by a consensus engine 214 and consensus thereon has been reached (216), such consensus information may not be reflected in a waiting list 204, and may be reflected in a PN node list 205 immediately after block #k+1 or a committed message has been received, thus enabling information of the removed node to be deleted.

Also, when a preset number or more of removed nodes occur after the corresponding node reflects the removed consensus node information in the waiting list 204 based on the policy, the removed nodes may be deleted from the PN node list.

Figure 4:
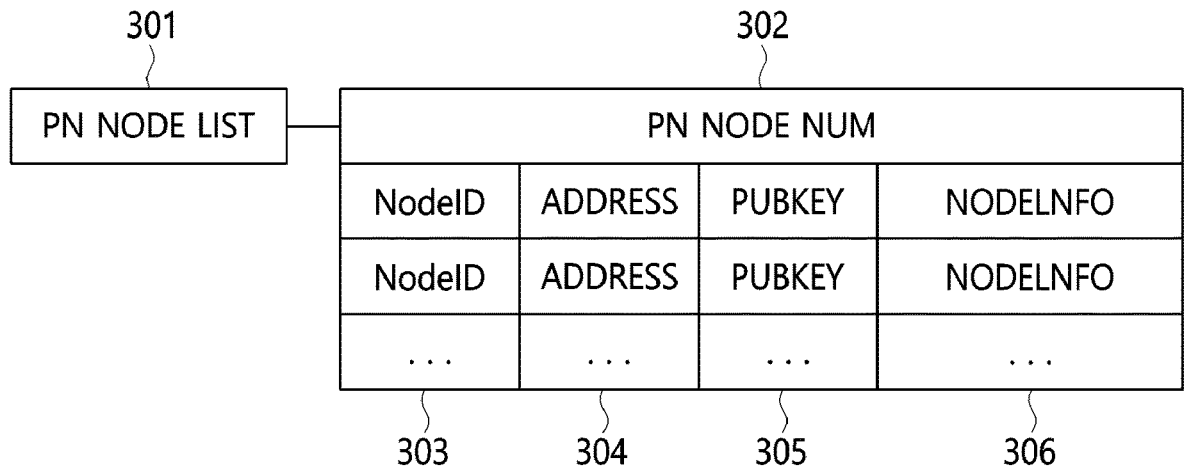
FIG. 4 is a diagram illustrating synchronized consensus node information (PN node list) according to an embodiment of the present disclosure.

FIG. 4 is a diagram illustrating synchronized consensus node information (PN node list) according to an embodiment of the present disclosure.

Referring to FIG. 4, a PN node list 301 may be composed of the number of participating nodes (PN node num 302) and information about participating nodes.

The information about participating nodes may include a node identifier (NodeID) 303, a network access address (Address) 304 of each node, a public key (PubKey) 305 of each node, and additional consensus node information (NodeInfo) 306.

The additional node information (NodeInfo) 306 may include information about consensus nodes required in a procedure for selecting committee nodes to be used to reach consensus on a block.

For example, the node information (NodeInfo) 306 may include information such as the number of the block that is used to select and verify a consensus node and on which participation in consensus is to be started, and registered nonce information.

Figure 5:
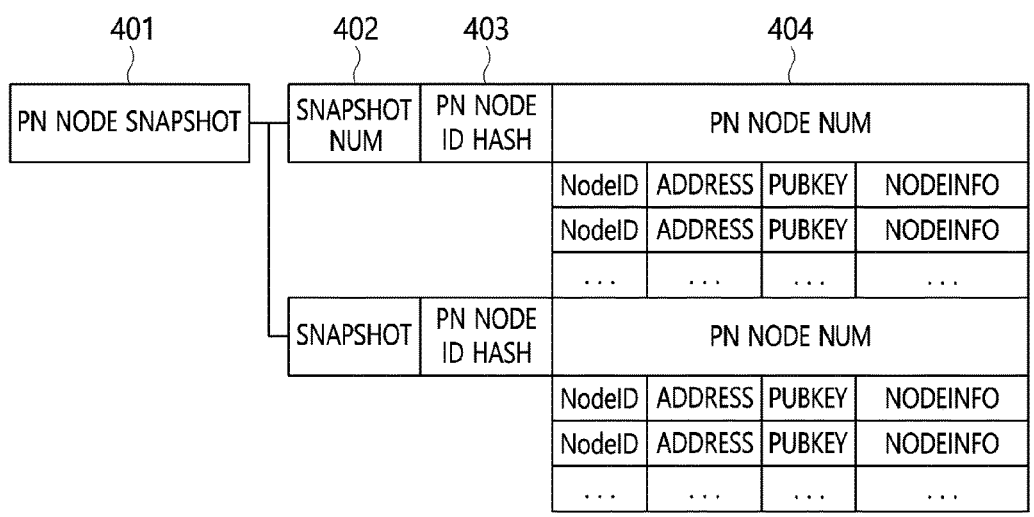
FIG. 5 is a diagram illustrating snapshots of participating consensus node information according to an embodiment of the present disclosure.

FIG. 5 is a diagram illustrating a snapshot of participating consensus node information according to an embodiment of the present disclosure.

Referring to FIG. 5, it can be seen that a snapshot (PN node snapshot) including consensus node information, generated in each consensus node information synchronization period according to an embodiment of the present disclosure, is illustrated.

A PN node snapshot 401 may be composed of a snapshot number (Snapshot Num) 402 corresponding to a section in which a snapshot is generated, a PN node identifier hash (PN Node ID Hash) 403 obtained by hashing the identifiers of participating nodes included in the corresponding snapshot, and consensus node information 404 of FIG. 3 included in each snapshot.

Here, snapshots may be designated to maintain only the n latest snapshots that are set based on the current section according to the management policy.

Further, the PN node ID hash 403 may be used in the case where pieces of information about participating nodes included in the corresponding snapshot are promptly compared with each other when a new node requests and receives snapshots in parallel from n different participating nodes.

Here, the PN node ID hash 403 may be included in a block header or a consensus message, and may also be used when pieces of consensus node information are promptly compared with each other in a section in which consensus on the corresponding block is reached.

That is, in order to promptly determine whether consensus node information of snapshots, requested and received by a new participating node from other participating nodes in a process of synchronizing previous consensus node information, is accurate, the PN node ID hash field 403 may be used to determine whether the consensus node information is accurate by comparing the PN node ID hash value (PN Node ID Hash) included in the corresponding snapshot with a PN Node ID hash value included in the block or consensus message.

Figure 6:
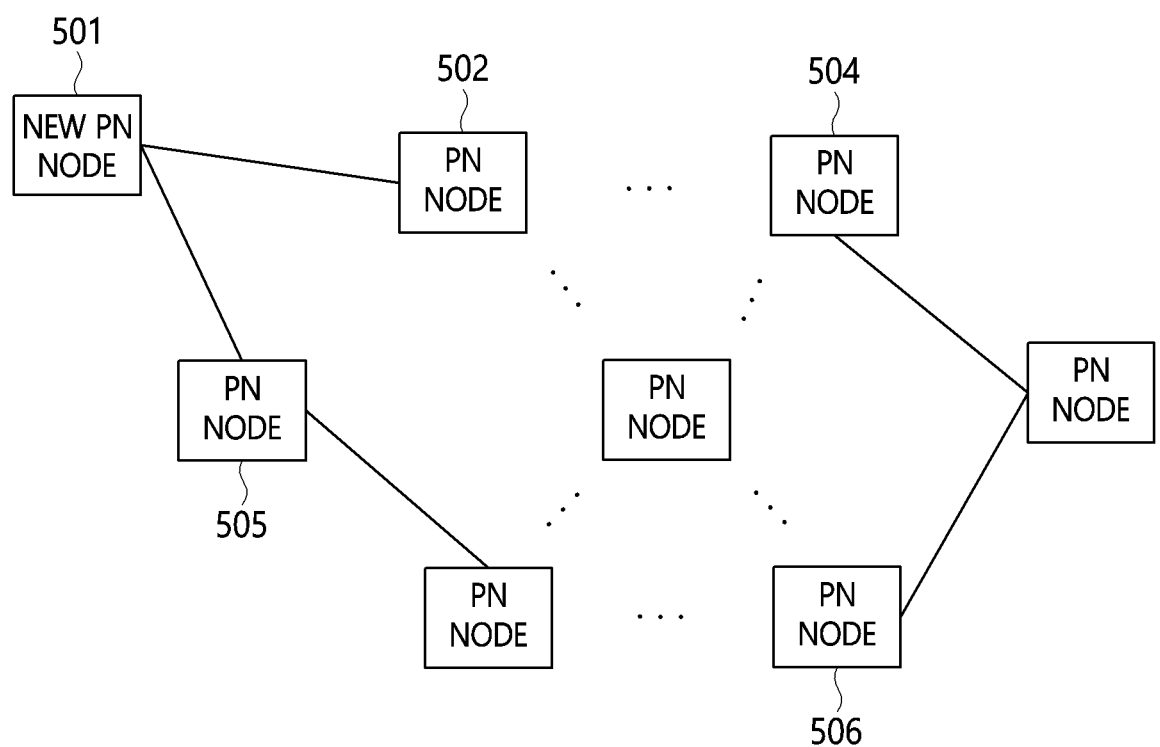
FIG. 6 is a diagram illustrating a process in which a new participating node receives consensus node information from an existing participating node and synchronizes the consensus node information according to an embodiment of the present disclosure.

FIG. 6 is a diagram illustrating a process in which a new participating node receives consensus node information from an existing participating node and synchronizes the consensus node information according to an embodiment of the present disclosure.

Referring to FIG. 6, a new node (New PN Node) 501 may access a blockchain network and register PN nodes 502 and 505 as peers over a p2p network.

Thereafter, when the new node 501 starts to receive a new consensus block or a committed message after block synchronization has been completed through a block synchronization process, the new node 501 may start to synchronize previous consensus node information.

First, the new node 501 may identify a section corresponding to a block received thereby.

If the new node 501 identifies the corresponding section as section i, the new node 501 may wait for consensus node information to be synchronized until the last block of the corresponding section is received.

Here, when the last block of the section is received, the new node 501 may transfer a request for snapshots of section i to the PN nodes 502 and 505, registered as peers.

The new node, having received the snapshots from the peers, may identify whether the snapshots match each other, and may randomly select n different participating nodes from among the partitioning nodes for the corresponding snapshots.

Also, the new node having received the snapshots may request and receive snapshots of section i from the selected participating nodes, and may determine whether the received snapshots match the snapshots received from the peers.

When the snapshots match each other, the new node having received the snapshots may set its own consensus node information (PN node list) as the participating node included in the corresponding snapshot, and may broadcast, to the blockchain network, a participating node registration request to allow the new node itself to participate, as a participating node, in block consensus.

In this case, when the participating node registration request for the new node has been processed through the consensus process described with reference to FIG. 2, the new node may participate in block consensus after information about the registered new node is synchronized with existing participating nodes.

Figure 7:
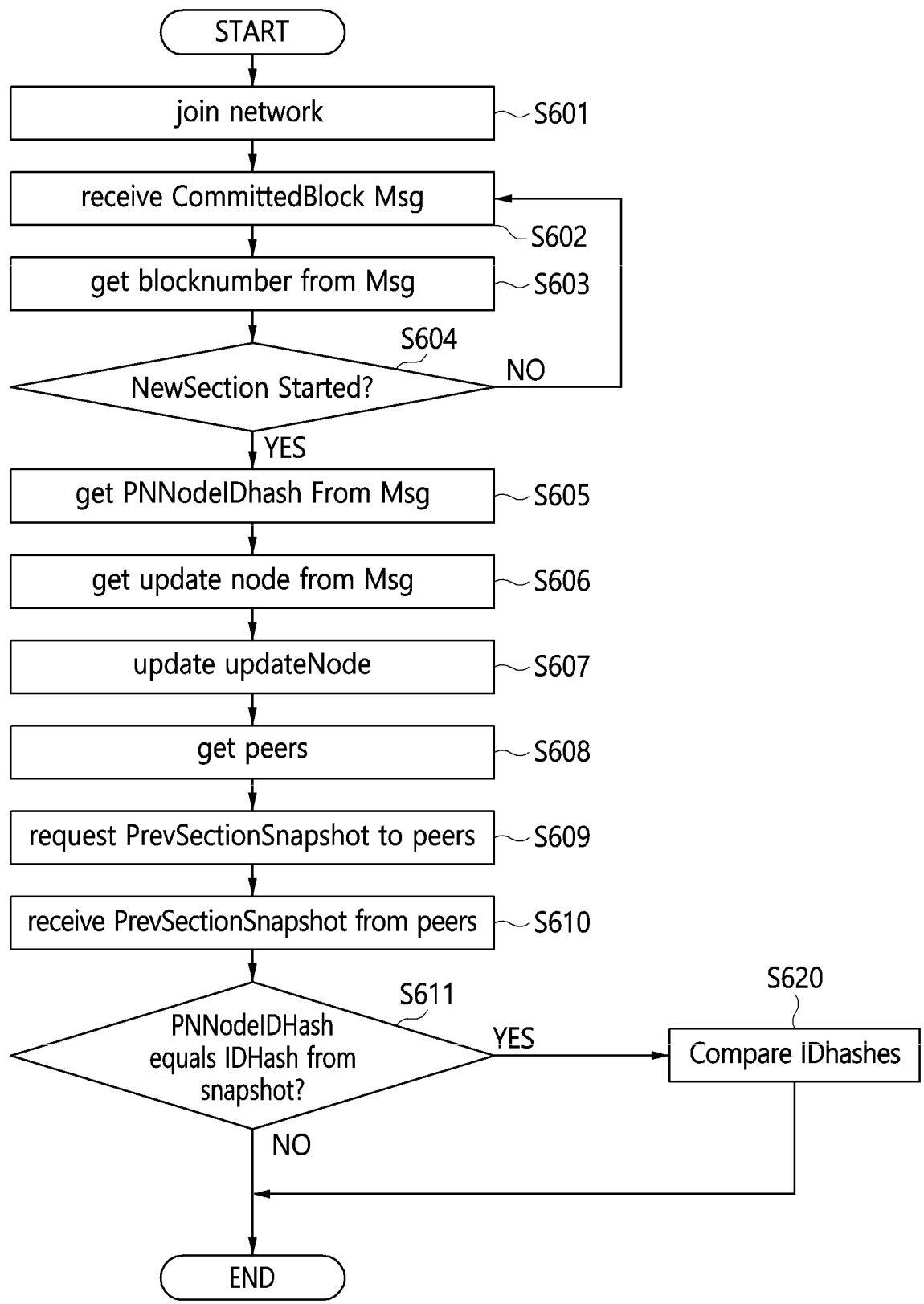
FIG. 7 is an operation flowchart illustrating a method for synchronizing consensus node information to allow a new node to participate in consensus in a blockchain network according to an embodiment of the present disclosure.
Figure 8:
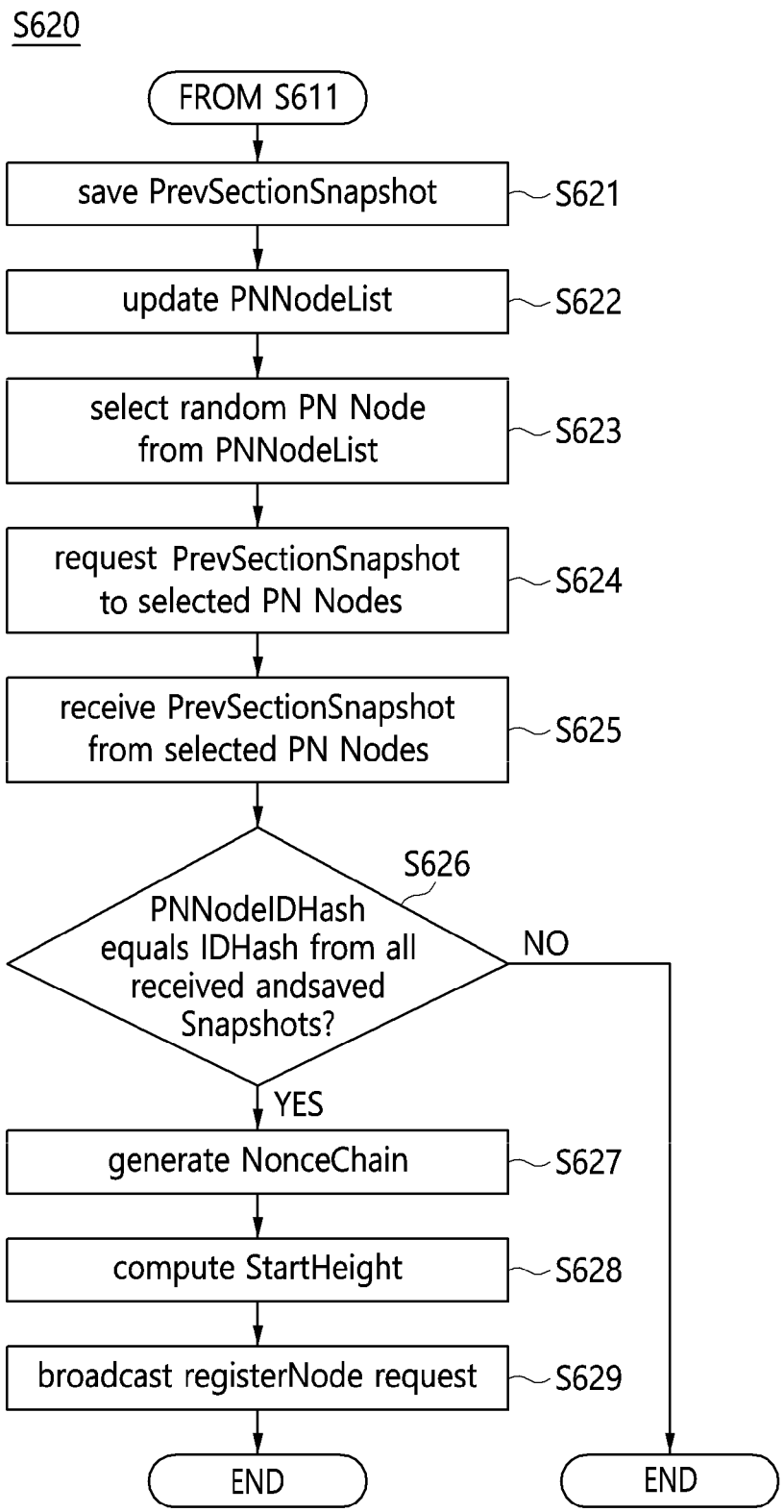
FIG. 8 is an operation flowchart illustrating in detail an example of the step of comparing IDHash values illustrated in FIG. 7.

FIG. 7 is an operation flowchart illustrating a method for synchronizing consensus node information to allow a new node to participate in consensus in a blockchain network according to an embodiment of the present disclosure. FIG. 8 is an operation flowchart illustrating in detail an example of the step of comparing IDHash values illustrated in FIG. 7.

It can be seen that FIG. 7 illustrates in detail a method for synchronizing consensus node information to allow the new node to participate in consensus, as illustrated in FIG. 6.

Referring to FIG. 7, in the method for synchronizing consensus node information to allow the new node to participate in consensus according to the embodiment of the present disclosure, a committed message for block consensus may be received from a blockchain network, and nodes participating in the block consensus may be verified at steps S601 to S626.

First, at step S601, the new node may be connected to the blockchain network (join the blockchain network).

At step S602, after block synchronization has been completed, a committed message (committed block message) may be received.

At step S603, a received block number may be identified.

At step S604, when the block number is identified, whether the corresponding block is a start block of a new section may be determined.

Here, at step S604, a section corresponding to block consensus, included in the committed message, may be identified, and a block corresponding to the section may be received from the blockchain network.

At step S605, when it is determined that the block is the start block of the new section, hash values PNNodeIDHash of identifiers of participating nodes that have completed synchronization up to a previous section included in the committed message may be extracted.

Here, step S606 may be performed to get consensus node information of the update node included in the corresponding block or committed message.

At step S607, the consensus node information of the update node may be registered in the update node list updateNodeList of a node manager.

At step S608, information about peer consensus nodes joining a p2p network may be obtained.

At step S609, snapshots of participating nodes in the previous section (PrevSectionSnapshot) may be requested from the corresponding peers.

At step S610, the requested snapshots may be received.

Here, at step S610, after the last block corresponding to the section is received, snapshots including hash values of nodes participating in block consensus may be received from adjacent nodes.

At step S611, nodes participating in the block consensus may be verified by comparing the hash values included in the snapshots with each other as to whether the hash values are equal to each other.

Here, at step S611, PNNodeIDHash and IDHash values that are included in the committed messages may be compared with each other to determine whether the received snapshots match each other and are accurate.

Here, in the procedure at step S611, when the PNNodeIDHash and IDHash values are not equal to each other, the corresponding procedure may be terminated.

Here, in the procedure at step S611, when the PNNodeIDHash and IDHash values are equal to each other, the received snapshots may be saved in a snapshot list at step S621.

Here, at step S622, the PN node list of the node manager may be set to the consensus node information included in the corresponding snapshots.

Here, the consensus node information may include the number of nodes that are capable of participating in consensus and for which synchronization with the blockchain network is completed, node identifiers, the last nonce of a new nonce chain, and a block number on which participation in block consensus starts.

Here, at step S623, a preset number of random participating nodes (PN nodes) other than peers may be selected from the set consensus node information.

Here, at step S624, information about snapshots in the previous section may be requested from the selected random participating nodes.

Here, at step S625, information about snapshots in the previous section may be received from the selected random participating nodes.

At step S626, whether each received snapshot information matches previously received snapshot information and whether the IDHash value of the received snapshot is equal to the IDHash value of the saved snapshot or the IDHash value of the received committed message may be determined based on a comparison between the IDHash values.

Here, at step S626, when all peers of the new node are Byzantine nodes, whether IDHash values are duplicated may be determined so as to check the case where erroneous consensus node information is delivered.

Here, at step S626, when a PNNodeIDHash value is included in the committed message, a comparison and synchronization process may be simplified by requesting snapshots from all adjacent peers or from only a single peer.

Further, at step S626, in preparation for occurrence of a collision between hash values, the IDHash value of the committed message, the IDHash values of snapshots received from the peers, and the IDHash values of snapshots of randomly selected participating nodes may be compared with each other, and actual participating node lists thereof may be compared with each other to determine whether the participating node lists match each other.

Here, at step S626, when the new node completes synchronization of snapshot information with the existing participating nodes through the above process, information about subsequently updated nodes may be managed such that consensus node information is managed in the same manner as in existing participating nodes by considering the consensus node information of the update node present in the committed message.

Thereafter, at step S627, the new node may generate a nonce chain used to apply for participation in consensus so as to actually participate in consensus.

Also, at step S628, a block number required to participate in block consensus may be set to the block size of a start block of a section corresponding to the block consensus.

That is, at step S628, the new node may set a start height "Startheight" to the block number on which participation in consensus will start.

Here, at step S628, Startheight may be set as the start block of the section.

Finally, at step S629, a registration request to apply for registration of qualification to participate in consensus may be broadcasted to the blockchain network, and the process may be terminated.

That is, at step S629, consensus node information including the block number may be broadcasted to the blockchain network.

Figure 9:
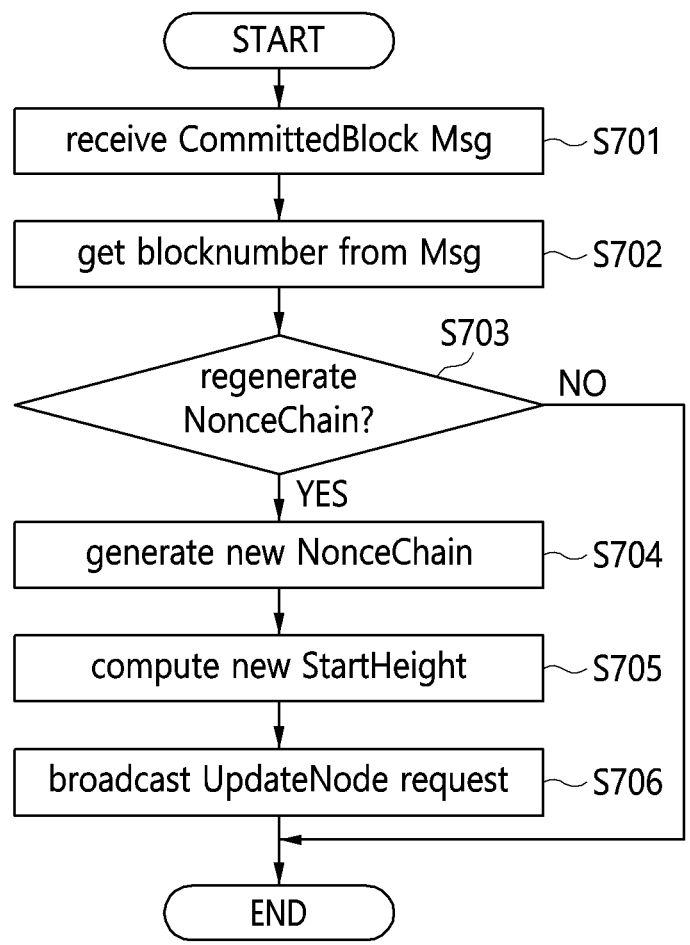
FIG. 9 is an operation flowchart of a method for synchronizing consensus node information to update consensus node information of an existing node in a blockchain network according to an embodiment of the present disclosure.

FIG. 9 is an operation flowchart of a method for synchronizing consensus node information to update the consensus node information of an existing node in a blockchain network according to an embodiment of the present disclosure.

Referring to FIG. 9, a process in which an existing participating node requests to update consensus node information thereof according to an embodiment of the present disclosure is illustrated.

The existing participating node may generate a nonce chain and broadcast the last nonce value and a start block Startheight to the network, thus acquiring qualification to participate in consensus.

Here, the nonce chain may be generated such that a nonce corresponding to a set size is generated and one nonce value is used for each block. If all nonce values are used, a new nonce chain may be generated, and the last nonce value of the newly generated nonce chain and the start block Startheight at which the new nonce chain starts to be used may be broadcasted. When the use of the existing nonce chain is completed, the existing participating node may acquire qualification to participate in consensus using the new nonce chain.

Referring to FIG. 9, in the method for synchronizing consensus node information to update the consensus node information in a blockchain network according to an embodiment of the present disclosure, a committed message for block consensus may be received from the blockchain network, and nodes participating in the block consensus may be verified at steps S701 and S702.

For this operation, at step S701, the existing participating node may receive the committed message.

At step S702, the existing participating node may get a block number from the committed message.

At step S703, whether generation of a new nonce chain is required may be determined.

In detail, at step S703, the block number required to participate in block consensus may be set to the block size Startheight of a start block of a section corresponding to the block consensus.

Here, at step S703, when the time point of generation of the new nonce chain is set such that Startheight is the start block of section i+1, the block number may be set to a block prior to a specific block in the previous section i.

For example, at step S703, when the size of the section is 10 blocks, an update request may be broadcasted in a process for consensus on first to fifth blocks in the previous section in consideration of propagation delay in broadcasting the update request.

Here, at step S703, a determination of the time point at which the new nonce chain is to be generated may be completed.

Further, at step S703, when there is no need to generate a new nonce chain, the process of synchronizing consensus node information may be terminated.

Here, at step S704, a new nonce chain may be generated.

At step S705, the block size Startheight of a start block at which the new nonce chain starts to be used may be computed.

Here, at step S703, the time point at which the new nonce chain is to be generated may be set using the propagation delay of the blockchain network and the block size Startheight of the start block.

Here, at step S706, the request to update the consensus node information may be broadcasted to the blockchain network.

Figure 10:
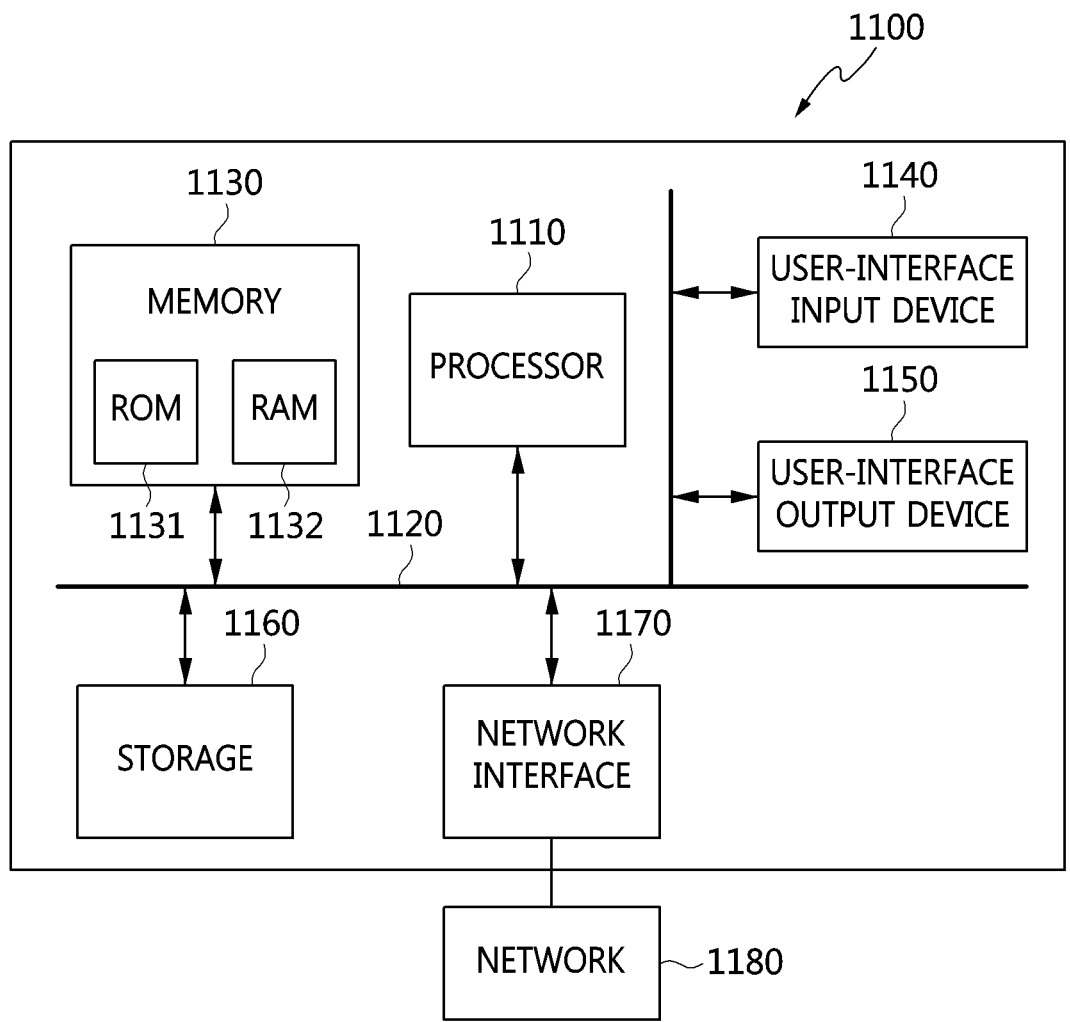
FIG. 10 is a diagram illustrating a computer system according to an embodiment of the present disclosure.

FIG. 10 is a diagram illustrating a computer system according to an embodiment of the present disclosure.

Referring to FIG. 10, an apparatus for synchronizing consensus node information in a blockchain network according to an embodiment of the present disclosure may be implemented in a computer system 1100, such as a computer-readable storage medium. As illustrated in FIG. 10, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for synchronizing consensus node information in a blockchain network according to an embodiment of the present disclosure may include one or more processors 1110 and execution memory 1130 for storing at least one program that is executed by the one or more processors 1110, wherein the at least one program is configured to receive a committed message for block consensus from the blockchain network and verify nodes participating in the block consensus, to set a block number required to participate in the block consensus to a block size of a start block of a section corresponding to the block consensus, and to broadcast consensus node information including the block number to the blockchain network.

Here, the at least one program may be configured to check a section corresponding to the block consensus, included in the committed message, and receive a block corresponding to the section from the blockchain network.

Here, the at least one program may be configured to receive a last block corresponding to the section and thereafter receive snapshots including hash values of nodes participating in the block consensus from adjacent nodes.

Here, the at least one program may be configured to verify the nodes participating in the block consensus by comparing the hash values included in the snapshots with each other to determine whether the hash values are equal to each other.

Here, the at least one program may be configured to set a time point at which a new nonce chain is to be generated using propagation delay of the blockchain network and the block size of the start block.

Here, the consensus node information includes a number of nodes that are capable of participating in consensus and for which synchronization with the blockchain network is completed, node identifiers, a last nonce of a new nonce chain, and a block number on which participation in block consensus starts.

The present disclosure may synchronize information about nodes qualified to participate in consensus in an environment in which nodes are frequently dynamically connected to and disconnected from a blockchain network.

As described above, in the apparatus and method for synchronizing consensus node information in a blockchain network according to the present disclosure, the configurations and schemes in the above-described embodiments are not limitedly applied, and some or all of the above embodiments can be selectively combined and configured such that various modifications are possible.

What is claimed is:

1. An apparatus for synchronizing consensus node information in a blockchain network, comprising:
   one or more processors; and
   an execution memory for storing at least one program that is executed by the one or more processors,
   wherein the at least one program is configured to:
   receive a committed message including a consensus block for block consensus from the blockchain network and verify nodes participating in the block consensus,
   set a block number required to participate in the block consensus to a block size of a start block of a section corresponding to the block consensus, the section being included in the committed message, and
   broadcast consensus node information including the block number to the blockchain network,
   wherein the consensus node information includes information related to nodes participating in consensus.

2. The apparatus of claim 1, wherein the at least one program is configured to check a section corresponding to the block consensus, included in the committed message, and receive a block corresponding to the section from the blockchain network.

3. The apparatus of claim 2, wherein the at least one program is configured to receive a last block corresponding to the section and thereafter receive snapshots including hash values of nodes participating in the block consensus from the nodes participating in the block consensus.

4. The apparatus of claim 3, wherein the at least one program is configured to verify the nodes participating in the block consensus by comparing the hash values included in the snapshots with each other to determine whether the hash values are equal to each other.

5. The apparatus of claim 4, wherein the at least one program is configured to set a start block at which a new nonce chain with linked nonces is to be generated using propagation delay of the blockchain network and the block size of the start block.

6. The apparatus of claim 5, wherein the consensus node information includes a number of nodes that are capable of participating in consensus and for which synchronization with the blockchain network is completed, node identifiers, a last nonce of the new nonce chain, and a block number on which participation in block consensus starts.

7. A method for synchronizing consensus node information in a blockchain network, the method being performed by an apparatus for synchronizing consensus node information in the blockchain network, the method comprising:
   receiving a committed message including a consensus block for block consensus from the blockchain network and verifying nodes participating in the block consensus;
   setting a block number required to participate in the block consensus to a block size of a start block of a section corresponding to the block consensus, the section being included in the committed message; and
   broadcasting consensus node information including the block number to the blockchain network,
   wherein the consensus node information includes information related to nodes participating in consensus.

8. The method of claim 7, wherein verifying the nodes comprises:
   checking a section corresponding to the block consensus, included in the committed message, and receiving a block corresponding to the section from the blockchain network.

9. The method of claim 8, wherein verifying the nodes further comprises:
   receiving a last block corresponding to the section and thereafter receiving snapshots including hash values of nodes participating in the block consensus from the nodes participating in the block consensus.

10. The method of claim 9, wherein verifying the nodes further comprises:
    verifying the nodes participating in the block consensus by comparing the hash values included in the snapshots with each other to determine whether the hash values are equal to each other.

11. The method of claim 10, wherein setting the block number comprises:
    setting a start block at which a new nonce chain with linked nonces is to be generated using propagation delay of the blockchain network and the block size of the start block.

12. The method of claim 11, wherein the consensus node information includes a number of nodes that are capable of participating in consensus and for which synchronization with the blockchain network is completed, node identifiers, a last nonce of the new nonce chain, and a block number on which participation in block consensus starts.

* * * * *